United States Patent
Kapadia et al.

(10) Patent No.: US 10,050,876 B2
(45) Date of Patent: Aug. 14, 2018

(54) OPTIMIZED INTER-VRF (VIRTUAL ROUTING AND FORWARDING) ROUTE LEAKING IN NETWORK OVERLAY BASED ENVIRONMENTS

(71) Applicant: CISCO TECHNOLOGY, INC., San Jose, CA (US)

(72) Inventors: Shyam Kapadia, San Jose, CA (US); Lukas Krattiger, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 14/539,176

(22) Filed: Nov. 12, 2014

(65) Prior Publication Data
US 2016/0134520 A1    May 12, 2016

(51) Int. Cl.
| | |
|---|---|
| *H04L 12/28* | (2006.01) |
| *H04L 12/715* | (2013.01) |
| *H04L 12/723* | (2013.01) |
| *H04L 12/741* | (2013.01) |
| *H04L 12/46* | (2006.01) |

(52) U.S. Cl.
CPC .......... *H04L 45/64* (2013.01); *H04L 12/4633* (2013.01); *H04L 45/04* (2013.01); *H04L 45/50* (2013.01); *H04L 45/54* (2013.01); *H04L 2012/4629* (2013.01)

(58) Field of Classification Search
CPC ..... H04L 49/70; H04L 45/66; H04L 12/4641; H04L 45/745; H04L 45/04; H04L 45/586; H04L 45/64; H04L 49/25; H04L 12/462; H04L 2212/00; G06F 9/45533
USPC .................................. 370/392, 254; 709/238
See application file for complete search history.

(56) References Cited

U.S. PATENT DOCUMENTS

| | | | |
|---|---|---|---|
| 7,742,477 B1 | 6/2010 | Gulchard et al. | |
| 7,792,097 B1 | 9/2010 | Wood et al. | |
| 8,451,837 B1 | 5/2013 | Schuett et al. | |
| 8,457,117 B1 | 6/2013 | Wood et al. | |
| 2005/0188106 A1* | 8/2005 | Pirbhai ................... H04L 45/54 |
| | | | 709/238 |
| 2010/0329252 A1 | 12/2010 | Mulamalla et al. | |
| 2013/0170490 A1 | 7/2013 | Kreeger et al. | |
| 2014/0050116 A1* | 2/2014 | Yang ..................... H04L 12/462 |
| | | | 370/254 |
| 2014/0250220 A1 | 9/2014 | Kapadia et al. | |
| 2014/0254590 A1 | 9/2014 | Yang et al. | |
| 2015/0010001 A1* | 1/2015 | Duda ....................... H04L 45/74 |
| | | | 370/392 |

(Continued)

OTHER PUBLICATIONS

Arcadia, Max; "Dynamic Fabric Automation Architecture", http://www.valleytalk.org/wp-content/uploads/2013/08/ciscoDFA.pdf, Jun. 26, 2013.

*Primary Examiner* — Alex Skripnikov
*Assistant Examiner* — Lionel Preval
(74) *Attorney, Agent, or Firm* — Cindy Kaplan

(57) ABSTRACT

In one embodiment, a method includes importing a route target for a remote Virtual Routing and Forwarding instance (VRF) at a leaf node in an overlay network, the leaf node comprising at least one local VRF configured thereon, processing routes received for the route target at the leaf node, and installing the routes for the remote VRF at the local VRF at the leaf node to enable inter-VRF communication via the leaf node. An apparatus and logic are also disclosed herein.

18 Claims, 4 Drawing Sheets

(56) References Cited

U.S. PATENT DOCUMENTS

| | | | |
|---|---|---|---|
| 2015/0089629 A1* | 3/2015 | Gu | H04L 45/507 |
| | | | 726/15 |
| 2015/0188808 A1* | 7/2015 | Ghanwani | H04L 45/586 |
| | | | 709/244 |
| 2015/0278148 A1* | 10/2015 | Sindhu | G06F 13/4081 |
| | | | 710/302 |
| 2015/0288540 A1* | 10/2015 | Kotalwar | H04L 12/4679 |
| | | | 370/254 |

* cited by examiner

OPTIMIZED INTER-VRF (VIRTUAL ROUTING AND FORWARDING) ROUTE LEAKING IN NETWORK OVERLAY BASED ENVIRONMENTS

TECHNICAL FIELD

The present disclosure relates generally to communication networks, and more particularly, to Virtual Routing and Forwarding (VRF) route leaking.

BACKGROUND

For multi-tenant deployments at scale, the number of supported VRF instances may be in the order of tens of thousands. A tenant may consist of multiple VRFs, where each VRF may have multiple IP networks. Traffic between end hosts within a VRF is naturally isolated, thereby preventing communication between VRFs and providing separate IP routing domains. However, communication between the routing isolation of VRFs is often desired, resulting in a need for inter-VRF route leaking.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
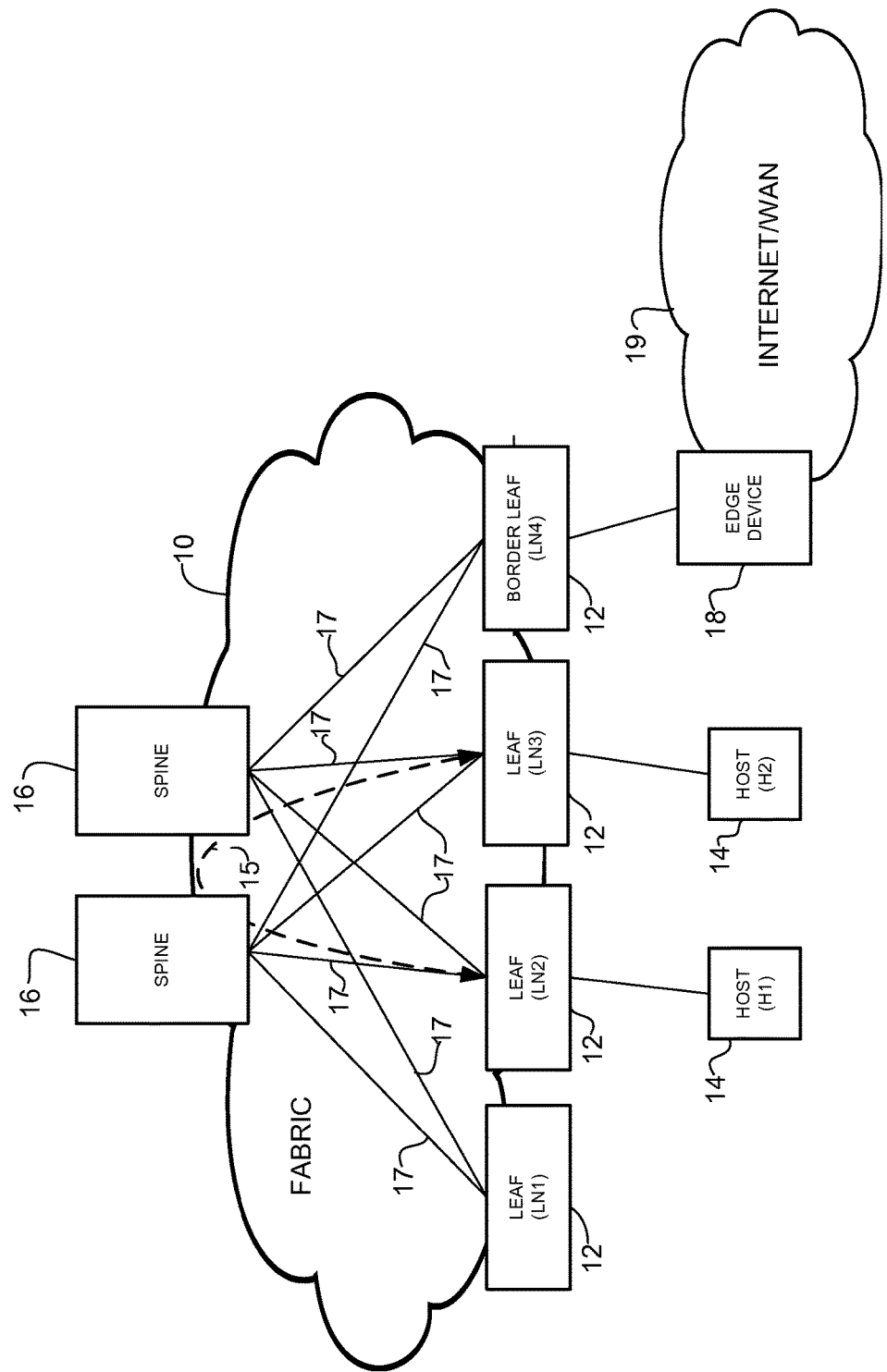
FIG. 1 illustrates an example of a network in which embodiments described herein may be implemented.

In one embodiment, a method generally comprises importing a route target for a remote Virtual Routing and Forwarding instance (VRF) at a leaf node in an overlay network, the leaf node comprising at least one local VRF configured thereon, processing routes received for the route target at the leaf node, and installing the routes for the remote VRF at the local VRF at the leaf node to enable inter-VRF communication via the leaf node.

In another embodiment, an apparatus generally comprises a processor for importing a route target for a remote Virtual Routing and Forwarding instance (VRF) at a leaf node in an overlay network, the leaf node comprising at least one local VRF configured thereon, and installing routes for the remote VRF at the local VRF at the leaf node to enable inter-VRF communication via the leaf node. The apparatus further comprises memory for storing the routes.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Dynamic Fabric Automation (DFA) is one example of a network overlay fabric architecture for facilitating data center networking. The topology of DFA may be based on a two-tier fat tree, in which a plurality of leaf nodes connects to each of a plurality of spine nodes. DFA fabrics may communicate, for example, with other DFA fabrics and other networks (e.g., Internet, data center network), through one or more border leaf nodes. DFA is one example of a technology that pairs overlay technologies (e.g., VXLAN (Virtual Extensible Local Area Network) and/or FabricPath) with a control-plane based on Multi-Protocol BGP (Border Gateway Protocol) (MP-BGP). Traffic separation is achieved using an MPLS (Multiprotocol Label Switching) type approach without the use of MPLS itself. This provides flexibility and scalability for optimized forwarding paths between end hosts and subnetworks.

Inter-VRF route leaking may be used in a DFA or other similar overlay network topology to provide communication between isolated VRFs with the most optimal forwarding path. Communication between VRFs may be used, for example, to reach the Internet via a special VRF, allow communication between end hosts in different VRFs, or allow access to shared resources provided to multiple tenants (VRFs) such as shared DHCP (Dynamic Host Configuration Protocol), DNS (Domain Name System), etc.

In order to provide route leaking functionality between VRFs, the VRFs may be configured on leafs, even if there is no end host attached for that specific VRF. In conventional systems, only when both the VRFs of interest are configured on a given leaf, is it possible to leak routes between these two VRFs on that leaf via appropriate route-target import/export statements. However, this may impact scalability. For example, if VRFs are configured on all leafs to provide route leaking functionality, overall scalability may be impacted and the approach of scaling-out the infrastructure may be limited whenever route leaking is needed. Ideally, a VRF should only be configured on a leaf if it has to serve local end-host below it within that VRF. In this way, resources can be provisioned in an optimal manner.

Route leaking between VRFs may also be performed at a data center edge on a border leaf or a directly connected edge router. This may result, however, in sub-optimal forwarding because the most optimized (direct) forwarding path between end hosts and subnetworks has to go via the VRF route leaking point. This may cause the traffic to pass through additional routing hops since traffic from an end host in one VRF to an end host in another VRF needs to go through a border leaf (potential choke point) designated as the route-leaking point. Ideally, only the traffic that truly needs to leave the data center should traverse the border-leaf.

The embodiments described herein provide for inter-VRF route leaking with optimized forwarding paths between end hosts. The embodiments eliminate the need for additional VRF creation only for the purpose of inter-VRF route leaking Certain embodiments may also be used when inter-VRF or external routes from outside a network (e.g., Data Center) are leaked into the fabric. The embodiments may provide resource savings and thus greater scalability and flexibility by simplifying the configuration, and optimizing forwarding between end hosts belonging to different tenants/VRFs. Multi-tenancy may therefore be provided at scale in applications such as Enterprise and Service Provider (SP) Data Centers. Optimal forwarding of inter-VRF traffic within the fabric is provided, independent of the fabric overlay.

Referring now to the drawings, and first to FIG. 1, an example of a network in which embodiments described herein may be implemented is shown. For simplification, only a small number of nodes (network devices) are shown. In the example of FIG. 1, a fabric 10 comprises a plurality of leaf nodes 12 (LN1, LN2, LN3, and LN4). The leaf nodes 12 may connect to one or more hosts 14 (e.g., servers hosting virtual machines (VMs)). The leaf nodes 12 are connected to a plurality of spine nodes 16 via links 17. Each leaf node 12 is connected to each of the spine nodes 16 and is configured to route communications between the hosts 14 and other network elements. The leaf nodes 12 and spine nodes 16 may be switches, routers, or other network devices comprising network switching or routing elements configured to perform forwarding functions (e.g., L2, L3, or L2/L3 devices). The leaf nodes 12 may be implemented, for example, as switching elements (e.g., Top of Rack (ToR) switches) or any other network element.

In one example, the fabric 10 comprises an overlay based fabric architecture with multiple tenants. A tenant may be allocated one or more VLANs (Virtual Local Area Networks) on a leaf node 12 to which virtual machines of the VLAN are connected. A tenant may also be associated with a VRF on the leaf node 12. Each VRF is associated with a layer 3 (L3) segment ID, which is used to encapsulate traffic routed over the fabric 10. It is to be understood that DFA is only an example and other types of overlay architectures may be used, without departing from the scope of the embodiments.

The leaf nodes 12 manage communications (e.g., routing and forwarding) originating from and destined to hosts 14 to which it is connected. The leaf nodes 12 may perform forwarding based on control plane functions (e.g., Fabric-Path with segment-ID based forwarding as well as control plane based on MP-BGP). For example, the fabric 10 may include an MP-BGP control plane that distributes end host 14 information among the leaf nodes 12 and provides optimized forwarding between end hosts and subnetworks. In addition to forwarding optimization, an anycast based distributed gateway functionality may be implemented, which allows for IP (Internet Protocol) mobility with flood domain localization in an efficient scale-out architecture.

In the example shown in FIG. 1, leaf node LN4 is a border leaf connected to an edge device (e.g., router) 18 located in an external network 19 (e.g., Internet/WAN (Wide Area Network)). The border leaf may be used to connect any type of external network device or service (e.g., firewall, router port, etc.) to the fabric 10.

The spine nodes 16 interconnect to all leaf nodes 12 in a Clos topology. The spine nodes 16 may forward traffic transparently based on out-header information encapsulated by the leaf nodes 12, for example. A router reflector (not shown) may exist on the spine node 16 to help distribute a single routing update to a large number of neighbors without the need to maintain a fully meshed BGP neighbor configuration and session relationship.

Each of the leaf nodes 12 and spine nodes 16 includes fabric interfaces that attach to other nodes in the fabric (i.e., fabric facing interfaces). The fabric interfaces may be configured to add an overlay header. The hosts 14 may be connected to the leaf nodes 12 at an L2 host interface. In the example shown in FIG. 1, leaf node LN2 is connected to host H1 and leaf node LN3 is connected to host H2. Each leaf node 12 may be connected to any number of hosts 14, which may include any number of virtual machines. Hosts H1 and H2 belong to different VRFs.

Each of the hosts 14 may have instantiated thereon one or more virtual switches for hosting one or more virtual machines (not shown). Virtual switches and virtual machines may be created and run on each physical server on top of a hypervisor installed on the server, for example. The virtual machines are configured to exchange communication with other virtual machines. The network may include any number of physical servers hosting any number of virtual machines. The host 14 may also comprise blade/physical servers without virtual machines. While the example depicts virtual machines, the proposed innovation is orthogonal to the fact that the end-hosts themselves may be virtualized or non-virtualized.

Each virtual machine may be a member of a tenant network that may contain one or more VLANs. The tenant network can span multiple VLANs. Each tenant network may also be associated with a segment identifier (segment ID), which is used to uniquely identify the tenant network in a particular fabric. The segment ID may be, for example, a 24-bit identifier. VXLAN is one example of an encapsulation scheme that has a VNI (Virtual Network Identifier) (24-bit identifier). In this way, the significance of the VLAN identifiers now becomes either leaf local or even leaf-port local. A VRF may be uniquely identified by an L3 segment ID or VNI. It is to be understood that the term 'segment' as used herein may refer to any type of identifier and does not dictate that the encapsulation should be VXLAN, but may be any other type of encapsulation scheme.

As described in detail below, one or more of the leaf nodes 12 may be configured to provide VRF route leaking without having to instantiate each of the VRFs on the nodes. This provides for optimal forwarding of traffic directly between leaf nodes, without having to transmit traffic to the border leaf node. For example, as shown in FIG. 1, traffic received from host H1 at leaf node LN2 and destined for host H2 may be transmitted directly to leaf node LN3 (as indicated at path 15) without having to go through border leaf node LN4. Also, there is no need to instantiate (configure) a VRF associated with H2 on leaf node LN2.

It is to be understood that the network shown in FIG. 1 is only an example and the embodiments described herein may be implemented in networks comprising different network topologies or network devices, or utilizing different protocols, without departing from the scope of the embodiments. For example, the network may include any number of edge nodes or intermediate (core) nodes (e.g., routers, switches, access layer devices, aggregation layer devices, gateways, or other network devices), which facilitate passage of data within the network. Moreover, the topology illustrated in FIG. 1 and described above is readily scalable and may accommodate a large number of components, as well as more complicated arrangements and configurations. For example, the network may include any number of fabrics, which may be geographically dispersed or located in the same geographic area.

Figure 2:
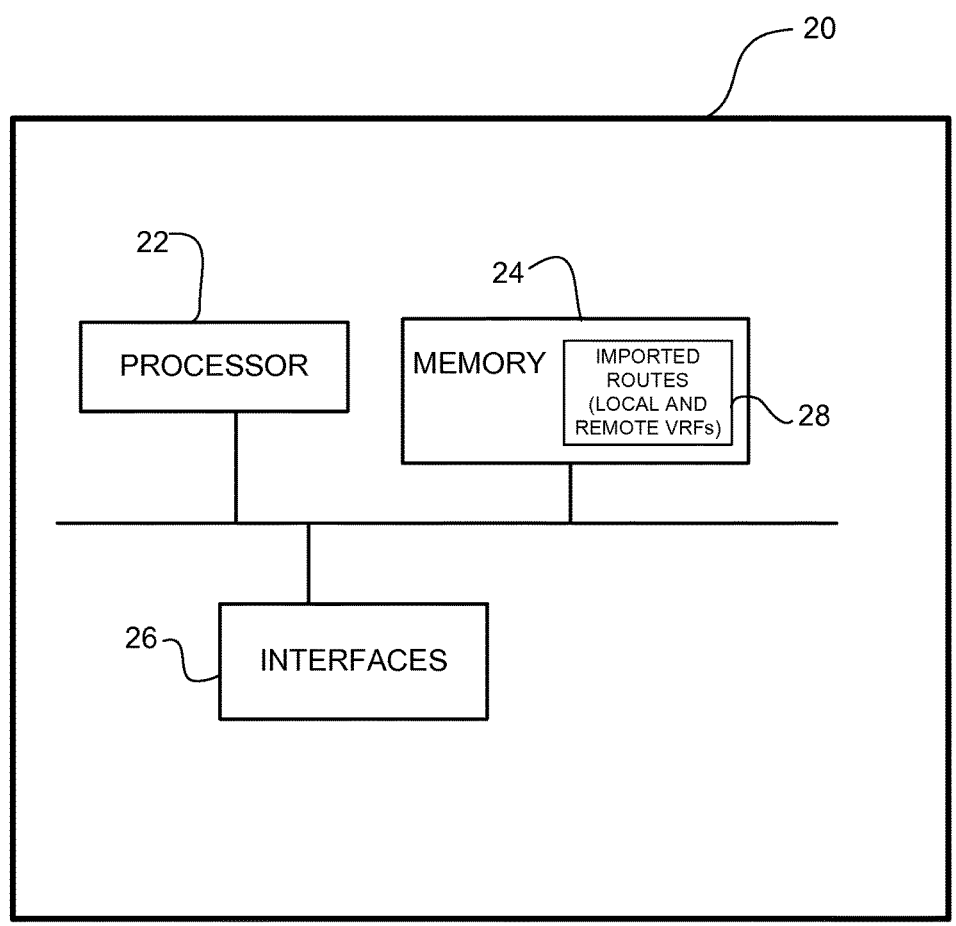
FIG. 2 depicts an example of a network device useful in implementing embodiments described herein.

FIG. 2 illustrates an example of a network device 20 (e.g., leaf node 12 in FIG. 1) that may be used to implement the embodiments described herein. In one embodiment, the network device 20 is a programmable machine that may be implemented using any suitable combination of hardware, firmware, and software. The network device 20 includes one or more processor 22, memory 24, and network interfaces 26.

Memory 24 may be a volatile memory or non-volatile storage, which stores various applications, operating systems, modules, and data for execution and use by the processor 22. For example, memory may store routing or forwarding tables (e.g., RIB (Routing Information Base), FIB (Forwarding Information Base)) (not shown) and imported routes (local VRF routes and remote VRF routes) 28, as described below. The device 20 may include any number of memory components.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interfaces 26 may comprise any number of interfaces (linecards, ports) for receiving data or transmitting data to other devices. The network interface may include, for example, an Ethernet interface for connection to a computer or network.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
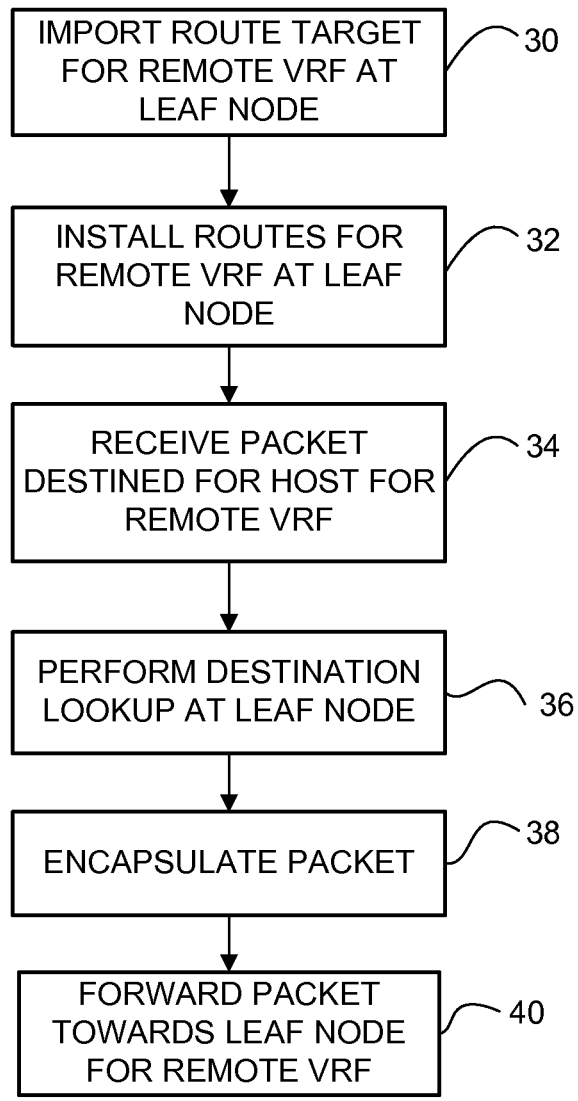
FIG. 3 is a flowchart illustrating an overview of a process for VRF route leaking, in accordance with one embodiment.

FIG. 3 is a flowchart illustrating an overview of a process for inter-VRF route leaking in an overlay network, in accordance with one embodiment. At step 30, a leaf node (e.g., LN2 in FIG. 1) imports a route target for a remote virtual routing and forwarding instance (e.g., VRF configured on leaf node LN3). The leaf node 12 has at least one local VRF configured thereon. The leaf node LN2 processes routes received for the route target and installs routes for the remote VRF at the local VRF at the leaf node to enable inter-VRF communication via the leaf node (step 32).

When the leaf node LN2 receives a packet destined for host H2 associated with the remote VRF (step 34), the leaf node performs a destination lookup (step 36). For example, the leaf node 12 may perform an L3 lookup for the destination in the local VRF that has routes for the remote VRF inserted therein. The leaf node 12 then encapsulates the packet (step 38) and forwards the packet towards the leaf node for the remote VRF (step 40). The leaf node may, for example, add the remote VRF assigned segment identifier to the original header on egress. In this way, when this packet is received on leaf node LN3, its forwarding lookup will occur in the right VRF thereby resulting in correct forwarding of the packet to H2.

It is to be understood that the process illustrated in FIG. 3 and described above is only an example and that steps may be modified, combined, added, or removed without departing from the scope of the embodiments.

Figure 4:
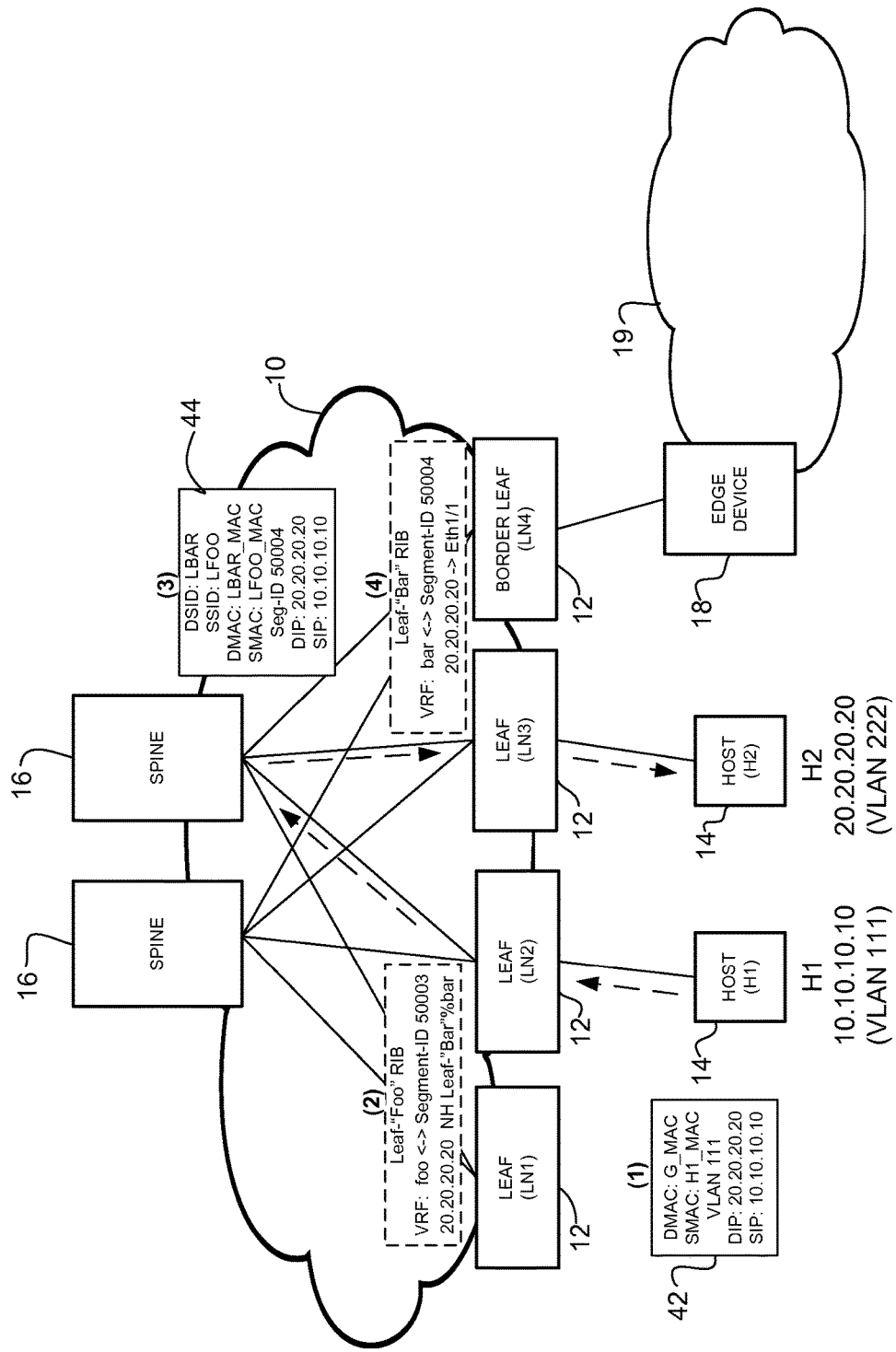
FIG. 4 illustrates an example of VRF route leaking in the network of FIG. 1.

FIG. 4 illustrates an example of route leaking between two different virtual routing and forwarding instances (VRF "foo" and VRF "bar"). In this example, the network overlay based fabric 10 comprises a network with BGP (Border Gateway Protocol) AS (Autonomous System) number 65000. Host H1 is configured with VLAN 111 and host H2 is configured with VLAN 222. The fabric 10 transmits traffic over VLAN 2501 and VLAN 2502 as defined below:

```
LEAF -"Foo"
    vlan 2501
        mode fabricpath
        vn-segment 50003
LEAF -"Bar"
    vlan 2502
        mode fabricpath
        vn-segment 50004
```

In this example, LN2 has VRF "foo" configured (instantiated) thereon and LN3 has VRF "bar" configured thereon. From the viewpoint of leaf node LN2, VRF "foo" is referred to as a local VRF (attached host H1 associated with VRF "foo") and VRF "bar" is referred to as a remote VRF (remote host H2 associated with VRF "bar").

The VRFs may be configured, for example, via a VNI configuration under the VRF context as follows:

```
vrf context foo
    vni 50003
    rd auto
    address-family ipv4 unicast
    route-target both auto
vrf context bar
    vni 50004
    rd auto
    address-family ipv4 unicast
    route-target both auto
router bgp 100
    vrf foo
        address-family ipv4 unicast
    vrf bar
        address-family ipv4 unicast
```

In one embodiment, a "route-target both auto" command ensures that a route target generated with $asn:$layer3-segmentId is automatically attached to the routes within this VRF and subsequently imported and exported in the VRF. In this example, in order to leak routes from VRF "foo" into VRF "bar", the only configuration needed is as follows:

```
vrf context bar
    vni 50004
    rd auto
    address-family ipv4 unicast
        route-target import 65000:50003 <--route-leak trigger
        route-target both auto
```

The following configuration may be used to leak routes from VRF "bar" into VRF "foo":

```
vrf context foo
    vni 50003
    rd auto
    address-family ipv4 unicast
        route-target import 65000:50004 <--route-leak trigger
        route-target both auto
```

It should be noted that the route target import statement may be associated with a route-map or an import statement that can use an additional filter in order to leak specific routes of choice between the VRFs. The examples described herein are used to leak all routes from VRF "bar" into VRF "foo" (and vice versa) and are presented in the above form for simplification. It is to be understood that the configuration commands described herein are only examples and that other formats may be used without departing from the scope of the embodiments.

In one embodiment, routes belonging to VRF "foo" that are inserted into VRF "bar" may be installed in hardware with the correct adjacency information. The adjacency information may include, for example, the destination MAC (Media Access Control) address of the leaf node 12 attached to the destination host (end node) 14 and a hardware Bridge-Domain (BD) that will in turn result in the remote traffic being forwarded to the fabric with an L3 segment-ID (e.g., VNI) corresponding to VRF "foo". This allows for the routing lookup at the egress leaf node 12 to be done in the correct VRF (e.g., VRF "foo") thereby resulting in the correct traffic forwarding.

Rather than instantiating VRF "foo" for this purpose at LN3, the instantiation of the configuration is auto-triggered on the leaf LN3 for VRF "foo". More specifically, a core-facing VLAN (locally allocated by the leaf) is configured that is mapped with the segment-ID corresponding to the VNI associated with VRF "foo". This will ensure that the platform code will have the right information while populating the next-hop/adjacency table for routes leaked from VRF "foo" into VRF "bar". An example of a sample configuration is shown below:

```
vrf context bar
    vni 50004
    rd auto
    address-family ipv4 unicast
        route-target import 65000:50003 <--route-leak trigger
        route-target both auto
    vlan 2501 <--resulting additional configuration (e.g., BD/hardware
    dataplane)
        mode fabricpath
        vn-segment 50003
```

Similarly, instead of instantiating VRF "bar" at LN2, the instantiation of the configuration is auto-triggered on the leaf LN2 for VRF "bar". More specifically, a core-facing VLAN (again locally allocated on LN2) is configured that is mapped with the segment-ID corresponding to the VNI associated with VRF "bar". This will ensure that the platform code will have the right information while populating the next-hop/adjacency table for routes leaked from VRF "bar" into VRF "foo". An example of a sample configuration is shown below:

```
vrf context foo
    vni 50003
    rd auto
    address-family ipv4 unicast
        route-target import 65000:50004 <--route-leak trigger
        route-target both auto
    vlan 2502 <--resulting additional configuration (e.g., BD/hardware
    dataplane)
        mode fabricpath
        vn-segment 50004
```

In certain embodiments, a template-based auto-configuration may be used. Based on the trigger of the configuration of the route-target import statement for inter-VRF route-leaking, this template may be auto-instantiated on the leaf as follows:

```
config profile vrf-leak
    vrf context $vrfName
    vni $vrf_segid
    rd auto
    address-family ipv4 unicast
    route-target import $asn:$leak_vrf_segid
    route-target both auto
    router bgp $asn
    vrf $vrfName
    address-family ipv4 unicast
    vlan $vlanId
    mode fabricpath
    vn-segment $leak_vrf_segid
    end
```

In a centralized embodiment, a VRF route leaking configuration profile (config-profile) may be created within a network manager (e.g., DCNM (Data Center Network Manager)) and appropriately populated with the correct parameters so that when the configuration profile gets pulled and instantiated on the leaf it will be correctly setup with the inter-VRF route leaking configuration.

Referring again to FIG. 4, the following describes an example of a flow path for a packet transmitted from host H1 and destined for host H2 after route leaking has been configured at leaf node LN2 for VRF "bar" (remote VRF). VRF "foo" (local VRF) is already configured on the leaf node LN2. Host H1 first generates a data packet 42 with destination host H2. As indicated at step (1) in FIG. 4, the packet has a destination MAC address of G MAC, source MAC address of H1 MAC, VLAN 111, destination IP address of 20.20.20.20, and source IP address 10.10.10.10. Leaf LN2 (leaf "foo") receives the packet 42 and performs an L3 lookup for the destination H2 in the given VRF ("foo") (as indicated at step (2) in FIG. 4). Based on the L3 lookup next hop, the packet gets segment-ID (VNI) of VRF "bar" assigned and is forwarded towards "bar" on leaf LN3. As shown at packet 44, leaf "foo" (LN2) encapsulates and adds the VRF assigned segment-ID (VNI) to the original header on egress (step (3)). Packet 44 is forwarded towards leaf "bar" (LN3). Leaf "bar" (LN3) receives and decapsulates the packet. Leaf "bar" performs an Layer 3 lookup and forwards the packet within VRF "bar" to host H2 (step (4)).

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:
1. A method comprising:
importing a route target for a remote Virtual Routing and Forwarding instance (VRF) at a leaf node in an overlay network with multiple tenants, the leaf node comprising at least one local VRF configured thereon, the overlay network comprising a plurality of leaf nodes, each of the leaf nodes in communication with each of a plurality of spine nodes;
processing routes received for the route target at the leaf node; and
installing said routes for said remote VRF at said local VRF at the leaf node to enable inter-VRF communication between isolated VRFs via the leaf node and optimize forwarding of traffic between the leaf nodes;

wherein said local VRF is instantiated on the leaf node and said remote VRF is not instantiated on the leaf node; and wherein a tenant is allocated one or more Virtual Local Area Networks (VLANs) on the leaf node and is associated with said local VRF on the leaf node, each of said local VRF and said remote VRF associated with a layer 3 segment identifier and wherein the layer 3 segment identifier for the remote VRF is used to forward packets at the leaf node.

2. The method of claim 1 further comprising receiving a packet destined for a host associated with said remote VRF and forwarding the packet towards a leaf node having said remote VRF configured thereon.

3. The method of claim 2 further comprising performing a layer 3 lookup for the destination host in said local VRF and encapsulating the packet with a segment identifier assigned to said remote VRF.

4. The method of claim 1 wherein importing said route target comprises configuring a route target import for a segment identifier associated with said remote VRF.

5. The method of claim 4 wherein said segment identifier comprises a Virtual Network Identifier (VNI) for use with VXLAN (Virtual Extensible Local Area Network).

6. The method of claim 1 wherein the overlay network comprises a Dynamic Fabric Automation network.

7. The method of claim 1 wherein importing said route target comprises configuring a core-facing virtual local area network that is mapped to a segment identifier corresponding to said remote VRF.

8. The method of claim 1 further comprising receiving a packet from a leaf node with said remote VRF configured thereon, decapsulating the packet, and performing a layer 3 lookup in said local VRF.

9. An apparatus comprising:
a processor for importing a route target for a remote Virtual Routing and Forwarding instance (VRF) at a leaf node in an overlay network with multiple tenants, the leaf node comprising at least one local VRF configured thereon and installing routes for said remote VRF at said local VRF at the leaf node to enable inter-VRF communication between isolated VRFs via the leaf node and optimize forwarding of traffic between leaf nodes; and memory for storing said routes;

wherein said local VRF is instantiated on the leaf node and said remote VRF is not instantiated on the leaf node; and wherein a tenant is allocated one or more Virtual Local Area Networks (VLANs) on the leaf node and is associated with said local VRF on the leaf node, each of said local VRF and said remote VRF associated with a layer 3 segment identifier and wherein the layer 3 segment identifier for the remote VRF is used to forward packets at the leaf node; and wherein the overlay network comprises the leaf nodes, each of the leaf nodes in communication with each of a plurality of spine nodes.

10. The apparatus of claim 9 wherein the processor is further operable to process a packet destined for a host associated with said remote VRF and forward the packet towards a leaf node having said remote VRF configured thereon.

11. The apparatus of claim 10 wherein the processor is further operable to perform a layer 3 lookup for the destination host in said local VRF and encapsulate the packet with a segment identifier assigned to said remote VRF.

12. The apparatus of claim 9 wherein importing said route target comprises configuring a route target import for a segment identifier associated with said remote VRF.

13. The apparatus of claim 12 wherein said segment identifier comprises a Virtual Network Identifier (VNI) for use with VXLAN (Virtual Extensible Local Area Network).

14. The apparatus of claim 9 wherein the overlay network comprises a Dynamic Fabric Automation network.

15. The apparatus of claim 9 wherein importing said route target comprises configuring a core-facing virtual local area network that is mapped to a segment identifier corresponding to said remote VRF.

16. The apparatus of claim 9 wherein the processor is further operable to process a packet received from a leaf node with said remote VRF configured thereon, decapsulate the packet, and perform a layer 3 lookup in said local VRF.

17. Logic encoded on one or more non-transitory computer readable media for execution by a processor and when executed operable to:
import a route target for a remote Virtual Routing and Forwarding instance (VRF) at a leaf node in an overlay network with multiple tenants, the leaf node comprising at least one local VRF configured thereon, the overlay network comprising a plurality of leaf nodes, each of the leaf nodes in communication with each of a plurality of spine nodes; and install routes for said remote VRF at said local VRF at the leaf node to enable inter-VRF communication between isolated VRFs via the leaf node and optimize forwarding of traffic between the leaf nodes;

wherein said local VRF is instantiated on the leaf node and said remote VRF is not instantiated on the leaf node; and wherein a tenant is allocated one or more Virtual Local Area Networks (VLANs) on the leaf node and is associated with said local VRF on the leaf node, each of said local VRF and said remote VRF associated with a layer 3 segment identifier and wherein the layer 3 segment identifier for the remote VRF is used to forward packets at the leaf node.

18. The logic of claim 17 further operable to perform a layer 3 lookup for a destination host, encapsulate the packet with a segment identifier assigned to said remote VRF, and forward the packet towards a leaf node having said remote VRF configured thereon.

* * * * *